(12) United States Patent
Cragun et al.

(10) Patent No.: US 7,240,339 B2
(45) Date of Patent: Jul. 3, 2007

(54) SYNTAX CHECKER WITH REAL-TIME FEEDBACK

(75) Inventors: Brian John Cragun, Rochester, MN (US); Gregory Richard Hintermeister, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1072 days.

(21) Appl. No.: 09/838,619

(22) Filed: Apr. 19, 2001

(65) Prior Publication Data

US 2002/0157025 A1    Oct. 24, 2002

(51) Int. Cl.
G06F 9/45 (2006.01)
(52) U.S. Cl. ..................................... 717/143
(58) Field of Classification Search ........ 717/141–143; 713/182–202
See application file for complete search history.

(56) References Cited

U.S. PATENT DOCUMENTS 6,643,784 B1 * 11/2003 McCulligh .................. 713/202

* cited by examiner

Primary Examiner—William H. Wood
(74) Attorney, Agent, or Firm—Roy W. Truelson

(57) ABSTRACT

A syntax checker that simultaneously provides real-time feedback to the user regarding more than one syntactic requirement is disclosed. The syntax checker can be configured by the user to provide feedback about certain rules or rule sets and to omit feedback for other rules or rule sets. Also disclosed is a password validation mechanism that checks a submitted password string against the requirements of more than one password-protected resource and provides visual feedback to the user regarding success or failure. This visual feedback is provided using three different visual cues.

13 Claims, 6 Drawing Sheets

Gregh Properties - Rchasf4d

User name: GREGH

Description: Greg Hintermeister 3-0146

Password: ******** — 305, 310

315 — Password format correct for client connections — 320

300

Previous sign-on: 04/12/00 14:07:08

Sign-on attempts not valid: 0

☐ User must change password at next sign-on
☐ Do client stuff
☑ Enable user for processing Groups | Personal | Capabilities | Jobs | Networks OK | Cancel | Help

FIG. 3A

SYNTAX CHECKER WITH REAL-TIME FEEDBACK

FIELD OF THE INVENTION

The present invention relates to data processing systems. More particularly, the present invention relates to syntax validation.

BACKGROUND OF THE INVENTION

Computer systems vary to a large degree, but a common trait shared by user-based computer systems is the ability to receive information from a user, manipulate it somehow, and present the information back to the user. Generally speaking the information presented to the user by the computer system varies based upon the information provided by the user as input. This input information comes in many forms. It may be nothing more than a double click with a pointing device or it may amount to pages and pages of typewritten text for a paper or a book. In some cases it is important for the user to format the information in a specific way. For example, a computer user who sets a password or who submits a database query must take care to ensure that the input information follows a particular format. If care is not taken, the user password will not be set or the database query will not be valid. This patent involves how a computer system provides feedback to a user when receiving information that has been formatted incorrectly.

Present day feedback mechanisms do inform the user of the improperly formatted password. More sophisticated mechanisms may even be specific about the particular rule that has been violated. The problem, though, is that passwords, like many format-specific items, often have format requirements involving several different rules, and the rules may vary depending upon anticipated uses. For example, a password may be valid on for one resource, but not for another. This means, of course, that the user is told only that there is a format problem, or in the best case that there is a specific formatting problem, but the user is not told whether other formatting rules have been violated. The user, then, may correct one formatting problem only to learn later that the solution to the first problem causes one or more errors relative to other formatting requirements. Naturally, this can make for a very frustrating experience for the user.

Without a way to better inform users regarding formatting problems, user frustration regarding format-specific information entry will persist.

SUMMARY OF THE INVENTION

The problems set forth above are solved by the syntax checker of the present invention. The syntax checker simultaneously provides real-time feedback to the user regarding more than one syntactic requirement. For example, if three rules exist for the entry of format-specific information, the syntax checker of the present invention provides simultaneous feedback to the user regarding success or failure for each of the three rules. As a further feature, the syntax checker of the present invention can be configured by the user to provide feedback about certain rules or rule sets and to omit feedback for other rules or rule sets.

Also disclosed is a password validation mechanism that checks a password string against the requirements of more than one password-protected resource. For example, if a user wants to use one password to access three different resources, the disclosed password validation mechanism will validate the password string against the password requirements for each of the three resources and provide visual feedback to the user as to the success/failure of the password string for each resource. This visual feedback is provided using three different visual cues.

BRIEF DESCRIPTION OF THE DRAWINGS

FIGS. 3A through 3C are example screen shots of the visual cues used in the preferred embodiment.

DESCRIPTION OF THE PREFERRED EMBODIMENT

Figure 1:
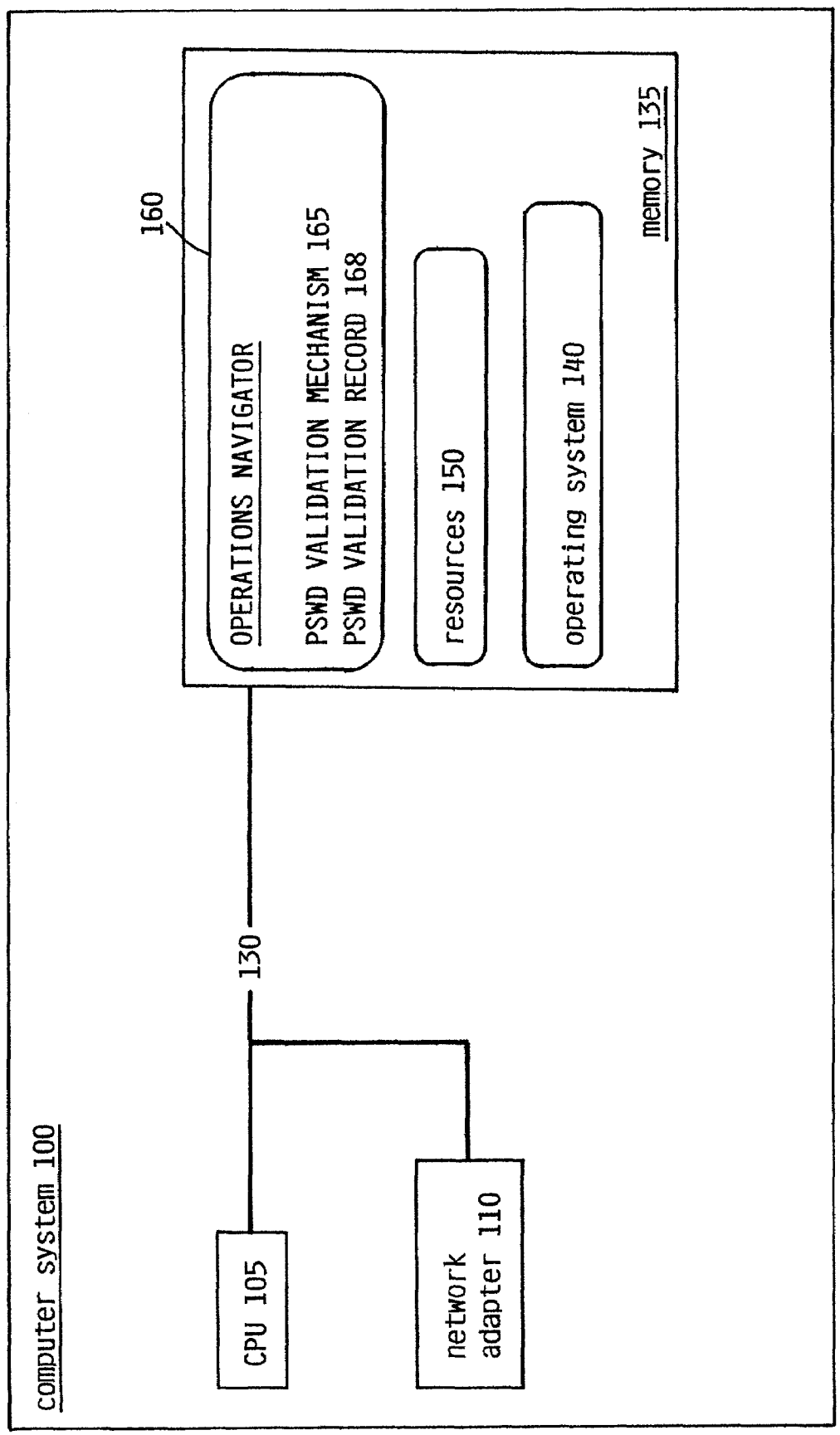
FIG. 1 is a block diagram of the computer system of the preferred embodiment of the present invention.

Turning now to the drawings, FIG. 1 shows a block diagram of the computer system of the preferred embodiment. The computer system of the preferred embodiment is an enhanced IBM Personal Computer 300PL. While computer system 100 is used as a client computer system within an IBM® eServer iSeries network, those skilled in the art will appreciate that the mechanisms and apparatus of the present invention apply equally to any computer system, regardless of whether the computer system is a complicated multi-user computing apparatus, a single user workstation, or a handheld device. As shown in the exploded view of FIG. 1, computer system 100 comprises main or central processing unit (CPU) 105 connected to memory 135 and network adapter 110. These system components are interconnected through the use of system bus 130.

Computer system 100 of the preferred embodiment utilizes well known virtual addressing mechanisms, allowing the programs of computer system 100 to work against a large virtual storage entity instead of against multiple, smaller storage entities. Memory 135 is, however, shown on FIG. 1 as a monolithic entity because the programs of the preferred embodiment are not dependent upon any one type of memory arrangement (i.e., as stated, the present invention may be practiced on a variety of systems from a mainframe computer system to a handheld device).

There are a number of programs shown to reside in memory 135. Operating system 140 of the preferred embodiment is the multitasking operating system known in the industry as Windows 2000®, which is licensed by Microsoft Corporation. However, those skilled in the art will appreciate that the spirit and scope of the present invention is not limited to any one operating system. Also shown in memory 135 is Operations Navigator 160, which is licensed by IBM Corporation. Operations Navigator 160 is used within an IBM eServer iSeries networked computer system to provide graphical user interface access from client to server. Within Operations Navigator 160 is the syntax checker of the preferred embodiment. The syntax checker is represented by the combination of Password Validation Mechanism 165 (PVM 165) and Password Validation Records 168. PVM 165 uses Password Validation Records to simultaneously provide real-time feedback to the user regarding more than one password-related syntactic requirement. However, those skilled in the art will appreciate that the present invention is not limited to password-related syntactic requirements. Indeed other applications of the present inventions are equally appropriate. For example, the present invention could be applied to the multiple syntactic requirements of database formulas, database queries, and/or to compiler driven requirements for converting source code to object code. Lastly, resources 150 are shown in memory 135. In the preferred embodiment, resources 150 are password-protected entities. Database access, file access, applications (e.g., email, etc.), and network access are examples of such password-protected entities.

Also shown within computer system 100 is network adapter 110. Network adapter 110 is used to allow computer system 100 to participate in the network of the eServer iSeries system.

It is important to note that while the present invention has been (and will continue to be) described in the context of a fully functional computer system, the mechanisms of the present invention are capable of being distributed as a program product in a variety of forms, and there is no limitation as to the particular type of signal bearing media used to actually carry out the distribution. Examples of signal bearing media include: recordable type media such as floppy disks and CD ROMs and transmission type media such as digital and analog communications links.

Figure 2A:
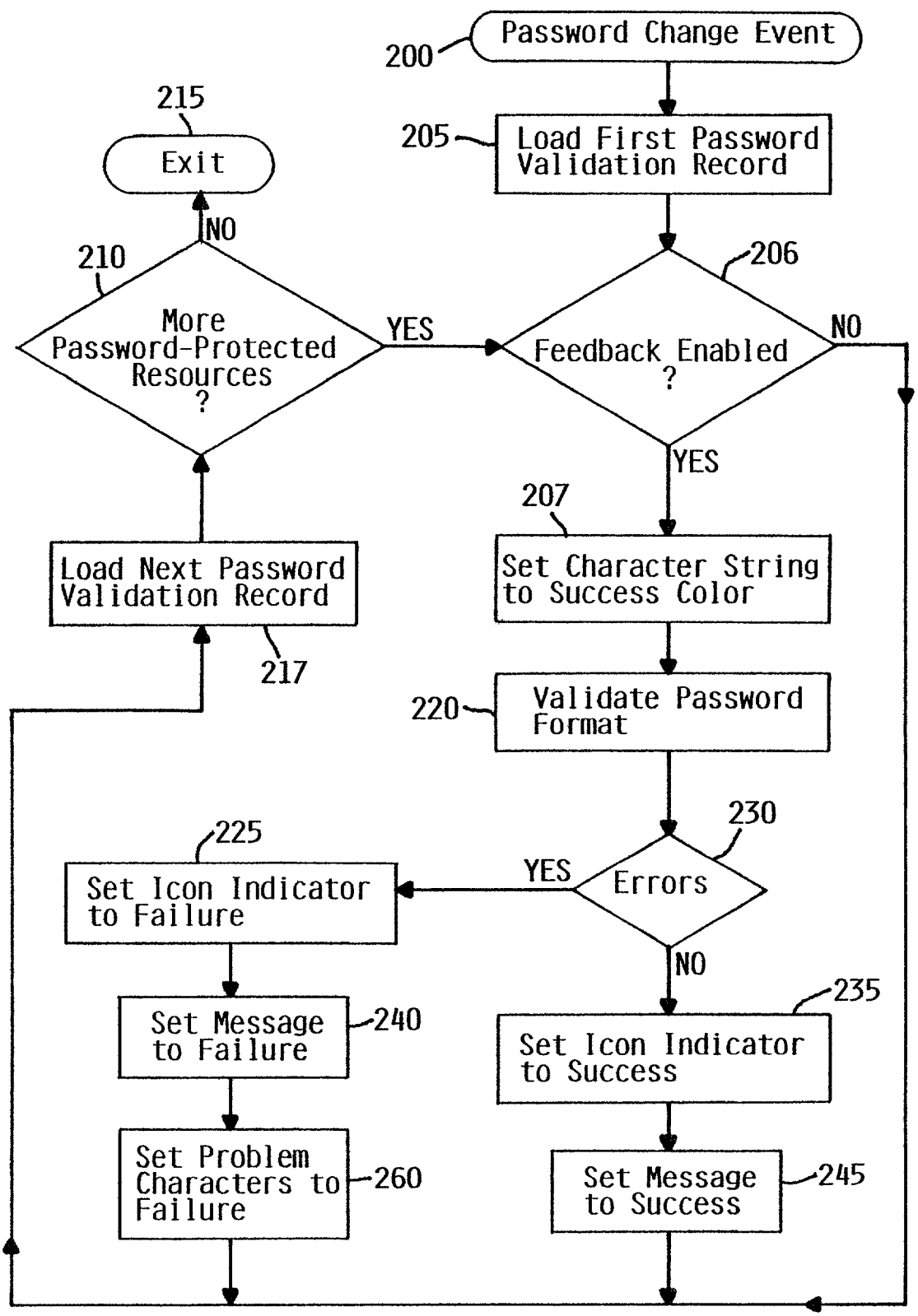
FIG. 2A is a flow diagram that shows steps used to carry out the password validation mechanism of the preferred embodiment of the present invention.

FIG. 2A is a flow diagram that shows steps used to carry out PVM 165 of the preferred embodiment of the present invention. In block 200, PVM 165 receives a password change event. In the preferred embodiment, a password change event is any user action that causes one or more characters within a password string to change. Examples include adding a character, deleting a character, pasting one or more new characters on top of one or more existing characters. As will become clear, PVM 165 executes once per resource per character change. So, if there are three resources at issue and the user is entering the fourth character of a password string, PVM 165 will have already executed at least eleven times. A password in the preferred embodiment is a string of one or more characters.

In processing block 205, PVM 165 loads the first password validation record. As discussed above, the preferred embodiment uses one password validation record for each resource type.

Figure 2B:
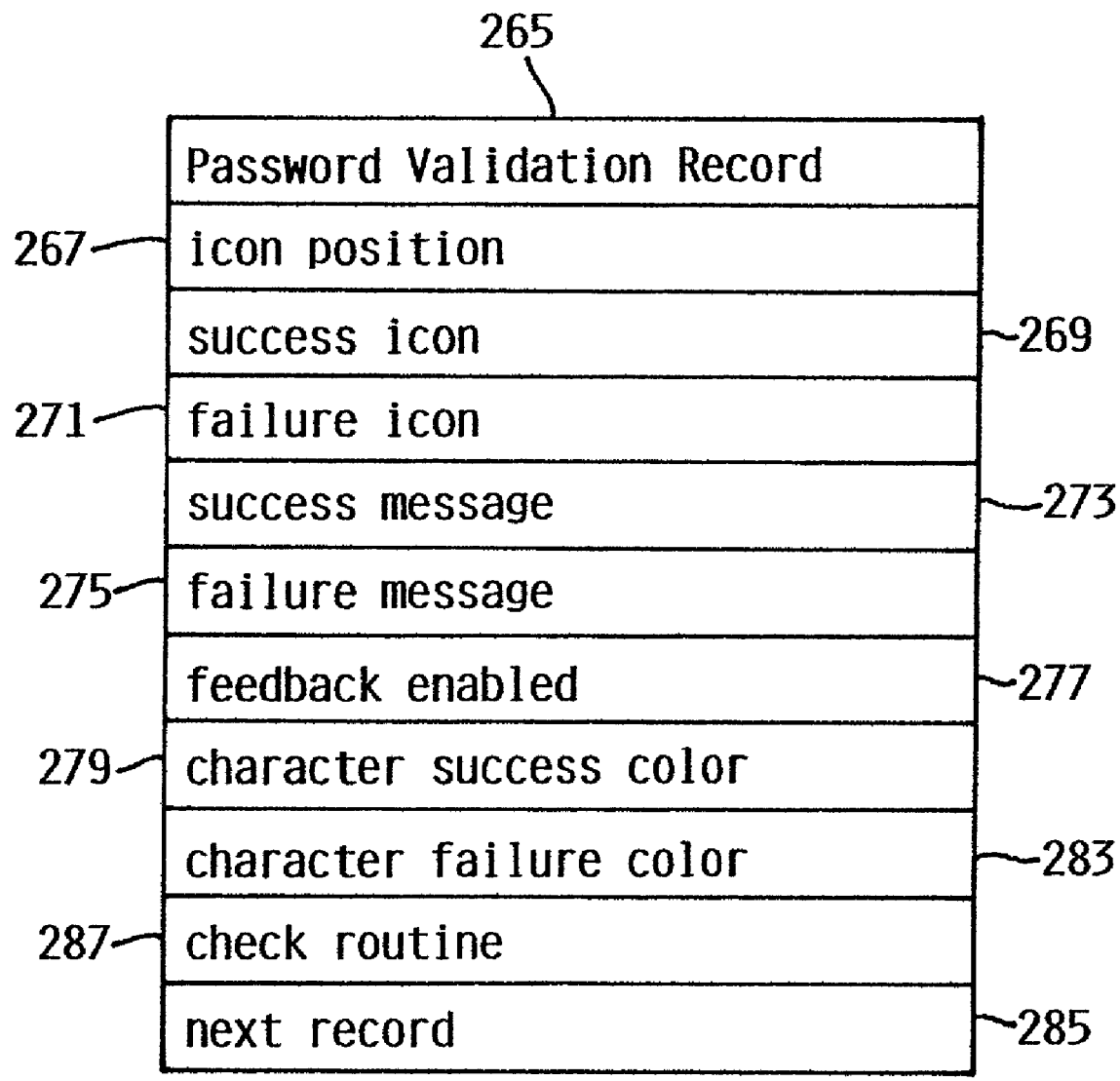
FIG. 2B is a block diagram that shows the password validation record of the preferred embodiment of the present invention.

Password validation record 265 of the preferred embodiment is shown in FIG. 2B. Password Validation Record 265 is one of Password Validation Records 168. Icon position field 267 is used to store the display position of the success or failure icon for the password-protected resource that is represented by the particular password validation record. Success and failure icon fields (269 and 271 respectively) are used to store the respective success and failure icons for the password-protected resource at issue. Success and failure message fields (273 and 275 respectively) are similarly used to store the respective success and failure messages for the password-protected resource at issue. Feedback enabled field 277 is a binary field set by the user to indicate whether feedback is desired to with respect to the particular resource. In the preferred embodiment, character success color and failure color fields (279 and 283 respectively) are used to present the characters to the user in a highlighted fashion. Character success color is black and the character failure color is different for each resource to point out which character(s) is problematic for which resource. If a given character is a problem for more than one resource, its color will be shown based upon the last resource checked. The check routine field is used to specify the program that is to be used to validate the syntax of the particular password for the resource at issue. Said another way, PVM 165 uses this field to invoke a program to check the validity of the password string for the resource represented by the particular password validation record. The last field in password validation record 265, next record field 285, is used to chain password validation records together so that PVM 165 can reference and load each password validation record and thereby syntactically check the password string based on the syntactic requirements of each resource.

In processing block 206, PVM 165 checks whether the user wants feedback for the particular resource. This is accomplished by checking feedback-enabled field 277 of PVR 265. The exact way in which this field is set by the user is not important to the benefits and advantages of the preferred embodiment, and is therefore, not described herein. If the user does not want feedback for the particular resource, PVM 217 proceeds to block 217 to load the next password validation record.

Assuming here that feedback is desired, PVM 165 sets the current string of characters to the success color contained in character success color field 279 [processing block 207]. As mentioned in the summary section of this patent, visual feedback regarding syntactic conformance is provided to the user of the preferred embodiment via three different visual cues. The character-based type of cue involves highlighting problematic characters in the password string in some fashion, while treating successful characters in the standard way (i.e., black in the preferred embodiment). As stated, problem characters can be highlighted through the use of underlining, color, italics, or the manipulation of some other type of character-oriented attribute(s) (color is used in the preferred embodiment). The next type of visual cue involves the use of success/failure messages. These messages are implemented as floating text in the preferred embodiment. The last type of visual cue involves the use of success icons and failure icons for each of resource (see processing blocks 225 and 235).

Once the character indicators have been set to "success" in processing block 207, PVM 165 invokes the program referenced in check routine field 287 of password validation record 265 to validate the password represented by the current string. This validation is performed based upon the syntactic requirements of the resource represented by the password validation record [processing block 220]. The information returned from the validation program amounts to a list of problematic characters. Of course, if there are no problematic characters, the current string is determined to be syntactically valid for the particular resource. The returned information is considered in decision block 230. If there are no errors reported, PVM 165 retrieves the success icon from success icon field 269 of password validation record 265 and places it in the screen position specified by icon position field 267 [processing block 235]. PVM 165 also sets the float message for the success icon using success message field 273 so that an appropriate message is displayed when the user hovers a position indicator over the success icon [processing block 245]. If errors are reported, PVM 165 retrieves the failure icon from failure icon field 271 of password validation record 265 and places it in the screen position specified by icon position field 267 [processing block 225]. PVM 165 also sets the float message for the failure icon using failure message field 275 so that an appropriate message is displayed when the user hovers a pointing device over the failure icon [processing block 240]. Problematic characters are then highlighted in processing block 260.

Regardless of whether errors were detected in decision block 230, the execution path of PVM 165 ultimately proceeds to processing block 217 where PVM 165 attempts to load the next password validation record using next record field 285. If next record field 285 is empty, meaning that there are no more records in the chain (i.e., password-protected resources to check), PVM 165 terminates execution in block 215. If the next record is loaded successfully, PVM 165 continues processing for the next password-protected resource in [processing block 220]. This logic is represented by decision block 210.

Figure 3B:

FIGS. 3A and 3B show examples of the icon and message cues used in the preferred embodiment. Shown on FIG. 3A are success icons 300, 305, and 310. Each of these icons represent a particular resource that is available to the user. As shown, the syntax of current password string 315 is simultaneously shown as being correct for each of the three resources at issue. Floating success message 320 is displayed to the user when the user hovers their position indicator (not shown) over success icon 310. Shown on FIG. 3B are success icons 305, and 310 and failure icon 325. Again, each of these icons represent a particular resource that is available to the user. As shown, the syntax of current password string 335 is correct for the resources represented by success icons 305 and 310, but incorrect for the resource represented by failure icon 325. Floating failure message 330 is displayed to the user when the user hovers their position indicator (not shown) over failure icon 325.

Figure 3C:

FIG. 3C shows an example of how character cues are used in the preferred embodiment. FIG. 3C shows what password string 335 would look like if character highlighting were enabled for the 5250 terminal resource. For the purposes of explanation, the reader is asked to assume here that proper syntax for the 5250 terminal resource involves only alphabetic characters. Thus, the numeric character "1" is shown in highlighted form to help the user identify the problematic character. Of course, if more than one numeric character had been entered, more highlighting would be used (note: as mentioned, color is used in the preferred embodiment, but underlining is used in FIG. 3C to accommodate black and white patent printing restrictions). It should also be noted that substitute characters, such as an asterisks ("*"), are highlighted in the case where they are used to obscure passwords for security purposes.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims. For example, while three different types of visual cues are used in the preferred embodiment, other types of visual cues could be used. Similarly, while visual cues are used in the preferred embodiment other types of cues, like audio or tactile cues, could also be used.

What is claimed is:

1. A computer system, said computer system comprising:
   a bus;
   a central processing unit;
   memory, said memory being connected to said central processing unit via said bus; and
   a password validation mechanism for verifying a single common password string for accessing a plurality of password-protected resources, each said password-protected resource having a single corresponding set of validity requirements of a plurality of sets of validity requirements, each said set of validity requirements independently defining requirements of a valid password string for accessing the corresponding password-protected resource, said password protection mechanism verifying simultaneous compliance of a single common password string with each said set of validity requirements of said plurality of sets of validity requirements, said plurality of sets of validity requirements including a first set of validity requirements for a password string for accessing a first password-protected resource and a second set of validity requirements for a password string for accessing a second password-protected resource different from said first password-protected resource, said first set of validity requirements being different from said second set of validity requirements, said password validation mechanism providing simultaneous feedback to a user regarding validity of a said single common password string against each said set of said plurality of sets of validity requirements.

2. The computer system of claim 1, wherein said password validation mechanism provides simultaneous feedback to a user regarding validity of a said single password string against said plurality of sets of validity requirements by providing a respective different at least one visual cue corresponding to each said set of validity requirements.

3. The computer system of claim 1, wherein:
   there exists at least one password string satisfying said first set of validity requirements which does not satisfy said second set of validity requirements; and
   there exists at least on password string satisfying said second set of validity requirements which does not satisfy said first set of validity requirements.

4. A program product, said program product comprising:
   a memory;
   a program product disposed on said memory, said program product being a password validation mechanism for verifying a single common password string for accessing a plurality of password-protected resources, each said password-protected resource having a single corresponding set of validity requirements of a plurality of sets of validity requirements, each said set of validity requirements independently defining requirements of a valid password string for accessing the corresponding password-protected resource, said password protection mechanism verifying simultaneous compliance of a single common password string with each said set of validity requirements of said plurality of sets of validity requirements, said plurality of sets of validity requirements including a first set of validity requirements for a password string for accessing a first password-protected resource and a second set of validity requirements for a password string for accessing a second password-protected resource different from said first password-protected resource, said first set of validity requirements being different from said second set of validity requirements, said password validation mechanism providing simultaneous feedback to a user regarding validity of a said single common password string against each said set of said plurality of sets of validity requirements.

5. The program product of claim 4 wherein said password validation mechanism simultaneously provides feedback for each of said more than one resource.

6. The program product of claim 4 wherein said password validation mechanism simultaneously provides feedback for each resource using more than one visual cue.

7. The program product of claim 6 wherein said more than one visual cue is selected from the group consisting of icon presentation, message presentation, and character highlighting.

8. The computer program product of claim 6 wherein said password validation mechanism simultaneously provides feedback for each resource using a respective different at least one visual cue corresponding to each said resource.

9. A method for providing feedback to a user, said method comprising the steps of:
   receiving a common password string for use in accessing a plurality of password protected resources from said user;
   checking whether said common password string simultaneously conforms to each set of validity requirements of a plurality of sets of validity requirements, each said set of validity requirements defining requirements of a valid password for accessing a respective corresponding password-protected resource of said plurality of password-protected resources, said plurality of sets of validity requirements including a first set of validity requirements for a password for accessing a first password-protected resource and a second set of validity requirements for a password for accessing a second password-protected resource different from said first password-protected resource, said first set of validity requirements being different from said second set of validity requirements; and
   presenting said user with feedback regarding each said respective set of validity requirements for each of said more than one password-protected resource.

10. The method of claim 9 wherein said presenting step involves simultaneously providing feedback for each of said more than one resource.

11. The method of claim 9 wherein said presenting step involves simultaneously providing feedback for each resource using more than one visual cue.

12. The method of claim 11 wherein said more than one visual cue is selected from the group consisting of icon presentation, message presentation, and character highlighting.

13. The method of claim 11 wherein said presenting step involves simultaneously providing feedback for each resource using a respective different at least one visual cue corresponding to each said resource.

* * * * *